Patented Apr. 3, 1945

2,372,807

UNITED STATES PATENT OFFICE 2,372,807

ABSORPTION BASES

Kenneth R. Brown, Kennett Square, Pa., assignor to Atlas Powder Company, Wilmington, Del., a corporation of Delaware No Drawing. Application July 5, 1941,
Serial No. 401,291

7 Claims. (Cl. 167—63)

The present invention relates to improvements in absorption bases.

An object of the invention is to provide a composition useful in the preparation of creams, salves, ointments, etc., for drug and cosmetic uses and the like.

Another object of the invention is to provide an oleaginous material with a high water absorbing capacity.

A further objects is to provide an absorption base which can form emulsions with water, which emulsions remain stable in the presence of many medicinal and cosmetic agents.

The above and other objects will become apparent in the course of the following description.

An absorption base is an oleaginous composition containing an emulsifier or emulsifiers such that the composition is capable of absorbing water to form an emulsion of the water-in-oil type. It may be used as all or a part of the oleaginous material of an emulsion suitable for cosmetics, ointments, etc. It is usually employed in the preparation of W/O types of emulsions but absorption bases may also be used as a part of the oleaginous material in O/W emulsions. An absorption base may be employed either with or without addition of other emulsifiers or other oleaginous materials as desired.

In the cosmetic art absorption bases are used in the preparation of various types of emulsions and ointments. Among the emulsions are the various types of creams and lotions. Cosmetic ointments are also used to some extent.

In pharmacy there is an increasing tendency to improve the operation, texture, and appeal to the patient of the wide variety of ointments employed in dermatology and other fields of medicine. This has been done by following in general the lead of the cosmetic art into the use of emulsions to replace conventional ointments. The usual ointments are excessively greasy, unpleasant to use, practically unabsorbable by the skin, and frequently ineffective in bringing a medicament into useful contact with a body surface, especially a moist one. Another disadvantage of ordinary ointments is their property of staining cloth and other fabrics. Ointment bases of the absorption type have, therefore, been proposed by medical and pharmaceutical investigators to replace the customary oleaginous non-absorptive base. The advantages of the absorptive ointment bases are numerous. Where used without water at all, i. e. unemulsified, the absorptive ointments are capable of use on moist surfaces such as wounds, running sores, etc., with much more success than the non-absorptive types. This means better medication because of better local application of the medicament. The absorptive ointments are better absorbed into the skin. Also absorptive ointments are readily washable from the skin and from fabrics soiled from contact with the ointment.

From the standpoint of preparing cosmetic or medicated compositions an absorption base has the advantage of convenience and uniformity. The absorption base can be made up in large quantity either by the user or by a manufacturer and may be varied in composition to obtain the desired consistency or other such properties as are required by addition of various oils, waxes and the like customary in the preparation of cosmetic creams and pharmaceutical emulsions. The base is then used as a portion or all of the oleaginous content of the compounded cream or the like.

The absorption or ointment bases of the type of this invention are not limited in utility to the drug and cosmetic arts but are of value generally in the preparation of hydrophilic oleaginous compositions with or without water.

There have been a number of absorption bases proposed to fill this need. However, many of them have as the principal emulsifying constituent expensive derivatives not readily available. These and also the less expensive products which have been proposed are unsatisfactory in many instances because of instability of resulting emulsions in the presence of active ingredients, especially strong electrolytes. In pharmaceutical products, medicinal effects are sometimes hindered or destroyed by the known bases. Other defects of the known absorption bases are well known in the arts for which they are intended.

The present invention provides an absorption base comprising at least one oleaginous constituent together with an emulsifier of the type hereinafter to be described. The oleaginous portion of the base of this invention may be an oil, such as a mineral oil or a vegetable or animal oil, a wax, such as a paraffin wax, beeswax, or spermaceti, a fat, fatty acid, or fatty alcohol, or a mixture of such materials. The oleaginous materials listed are solely by way of example and other usual oleaginous materials employed in the arts may be used. It is sometimes advantageous also to incorporate other materials such as lanolin, anhydrous or hydrous, to give some particular quality to the product, or another emulsifier for a special effect.

Compounds of the type contemplated for use as emulsifiers in the present invention are described in detail and claimed in the copending application of K. R. Brown, Serial Number 341,903, which issued June 29, 1943, as Patent No. 2,322,821, of which the present application is a continuation in part and to which reference should be had for details of chemical structure, methods of preparation, sources of materials, etc., it being understood that the emulsions of the present invention include all of the compositions of my earlier application. For the purposes of the present invention, it will suffice to say that the emulsifiers are esterified polyhydroxylic materials of the types: cyclic inner ethers of hexitols, particularly the hexides; or mixtures of cyclic inner ethers of hexitols with cyclic inner ethers of hexane pentols; or external ethers or polymeric ethers of these materials, in which "polymeric" includes dimeric and further includes external ethers formed of identical or different inner ether units; or mixtures of two or more of the foregoing. These ethers can be prepared from the parent hexitols, or mixtures thereof with hexane pentols, and the ethers then esterified, but preferably, the fatty acid and the parent polyhydric alcohol are reacted together under conditions producing etherification of the alcohols and also esters of the ethers. Pure polyhydric alcohols can be used, if desired, but, particularly in the case of sorbitol, commercially available mixtures are suitable and, in many cases, are preferable to the purer products. Commercial sorbitol syrups such as can be obtained, for example, by the electrolytic reduction of glucose or by the catalytic hydrogenation of glucose, comprise sorbitol together with non-hexitol polyhydric materials, notably saccharitols. The term "saccharitols" designates a series of hexane pentols which can be considered as derivable from the saccharinic acids by exchange of carboxyl for carbinol.

The fatty acid which enters into the formation of emulsifiers is preferably one having six or more carbon atoms, especially the 12 to 18 carbon atom acids found in the natural esters of animal and vegetable oils and fats, although synthetically produced acids, such as margaric, can be used.

I have found that the most desirable emulsifiers are obtained when the reaction is so conducted that on an average the hydroxyl and ester values of the resulting product are substantially those corresponding to a hexide monoester. In this case the ratio of the hydroxyl value to the ester value is one, that is:

$$\frac{\text{Hydroxyl value}}{\text{Ester value}} = \frac{\text{grams KOH equivalent to hydroxyl}}{\text{grams KOH equivalent to combined acid}}$$

$$= \frac{1 \text{ equivalent KOH}}{1 \text{ equivalent KOH}} = 1$$

Due to the incidence of side reactions, the use of mixed polyhydroxylic materials and also the use of mixed acids from natural sources, the range of useful products contemplated by my invention will be found to have values for the ratio of hydroxyl to ester of 2.0 to 0.5.

Since, when using stoichimetric proportions, the initial ratio of acid equivalent to carbon atoms of the polyhydroxylic material is 1/6, and since the etherification and esterification processes involve only the loss of water with no loss of carbon, the ratio of acid equivalents to atoms of polyhydric residue carbon in the product is still 1/6, regardless of the extent of internal or external etherification. While the preferred ratio of acid equivalents to polyhydroxylic carbon atoms is 1/6 or 0.166, useful products may be obtained having ratios of somewhat less than 0.16, preferably, not below about 0.15, and also ratios somewhat higher than 0.16, preferably not over 0.25.

Instead of starting with the hexitols or mixed polyhydric alcohols, I may use preformed monoanhydrides of hexitols (hexitans) or dianhydrides of hexitols (hexides) or anhydrides of hexane pentols. For example, when starting with the hexide, I may carry out the esterification under nonetherifying conditions such as by using the acid chloride and pyridine, or any other suitable base, to neutralize the hydrochloric acid, formed in the reaction, or I may use the acid anhydride in place of the acid chloride. Esterifying a hexide in this manner gives only monomeric hexide esters. I may also react hexitols or mixtures thereof comprising hexane pentols, with mineral acids, or under etherifying conditions, in the absence of organic acid, purify the resulting mixture of mono- and polymeric inner ethers thus obtained with decolorizing carbon or other methods, and then esterify the resulting mixture of hydroxylic ethers with fatty acid under non-etherifying conditions.

The following examples from application Serial Number 341,903 are set out to illustrate the preparation of some of the emulsifiers that can be used in making the absorption bases of the present invention.

*Example 1*

182 g., dry basis, of technical sorbitol syrup, with solids comprising about 80% sorbitol and the remainder nonsorbitol polyhydroxylic materials, largely saccharitols, were placed in a flask and adjusted to a pH of 2.0 by the addition of 2.0 cc. of 85% $H_3PO_4$. To the resulting material were added 216 g. of distilled coconut oil fatty acids having an acid number of 275 and containing approximately 60% of lauric acid. This quantity of coconut oil fatty acid was 1.054 times the equivalent weight of fatty acid, the 5.4% excess of acid being used to compensate for acids distilled during the reaction. The reactants were heated together with agitation in an inert atmosphere of carbon dioxide for a total of two and one-half hours at 225° C. The reaction mixture had become uniformly clear in appearance after two hours at 225° C. and was then given a decolorizing treatment with a commercial activated carbon known as "Darco G–60." This treatment consisted in adding 2% Darco based on the total weight of the charge during the last half-hour of the heating at 225° C. The mixture was subsequently filtered free of carbon.

The product was an oily liquid having the following properties:

Hydroxyl value_____ 205
Ester value_____ 170
Viscosity at 25° C., centipoises_____ 439

The product was largely composed of the sorbide monoesters of coconut oil fatty acids together with small amounts of sorbitan esters and other ether-esters. It was a reddish yellow oil having a color of 60 units when read on a Hess-Ives tint photometer using a 6 mm. cell.

*Example 2*

3185 g. (17.5 mols) technical sorbitol syrup (of the type used in Example 1) measured on a dry basis were adjusted to a pH of 2.0 by the addition of 24 cc. 85% $H_3PO_4$. This syrup was then reacted with 4970 g. (about 17.5 mols) of triple-pressed stearic acid in an inert atmosphere of carbon dioxide for three hours twenty-five minutes at 245° C. The product was treated with 2% of its weight of activated carbon (Darco G-60) for one-half hour at 200° C. and subsequently filtered free of carbon. It was then deodorized for two hours at 140° C. by means of superheated steam and subjected to a second 2% Darco treatment. The final product had a color of 89 units as measured in a 6 mm. Hess-Ives tint photometer cell, and the following analytical values:

| | |
|---|---|
| Acid number | 4.5 |
| Hydroxyl value | 218 |
| Ester value | 135.5 |
| Melting point | ° C__ 42–43 |

The ester portion was composed principally of sorbide monoesters of triple pressed stearic acid and the remainder of sorbitan and other ether-esters of triple pressed stearic acid.

*Example 3*

114 g. (about 0.5 mol) of commercial myristic acid and 91 g., dry basis, (0.5 mol) technical sorbitol syrup (as in Example 1) which had been adjusted to a pH of 1.8 by the addition of $H_3PO_4$ were reacted for a period of one hour at 210° C. The reaction mixture was given an additional half-hour heating treatment at 210° C. in the presence of 2% Darco G–60 decolorizing carbon and was subsequently free of the carbon. The product had a color of 60 Hess-Ives units as read directly in a 6 mm. Hess-Ives tint photometer cell. The product had the following analytical values:

| | |
|---|---|
| Acid number | 6 |
| Hydroxyl value | 180 |
| Ester value | 161 |

The product comprising principally sorbide monomyristate was an excellent emulsifier. A 1% solution of the myristate in corn oil reduced the interfacial tension between this corn oil and water from 22.2 dynes/cm. to 2.6 dynes/cm.

*Example 4*

335 g. distilled coconut oil fatty acids were reacted with 285 g. mannitol in the presence of 1.71 cc. 85% $H_3PO_4$ for a total of two and one-quarter hours at 235° C. During the last half-hour at 235° C. the reaction mixture was given a Darco G–60 decolorizing treatment employing 2% Darco based upon the reactant weight. The reaction mixture was cooled to 180° C. and filtered free of carbon. The product was reddish oil having a color of 70 Hess-Ives units as measured directly in a 6 mm. Hess-Ives tint photometer cell and had the following analytical values:

| | |
|---|---|
| Acid number | 5 |
| Hydroxyl value | 180 |
| Ester value | 165 |

The product was composed chiefly of the mannide monoesters of the distilled acids derivable from coconut oil.

*Example 5*

378 g. (about one and one-third mols) triple-pressed stearic acid were reacted with 242 g. (about one and one-third mols) mannitol in the presence of 0.55 cc. 85% $H_3PO_4$ for a total of four hours at 245° C. During the last half-hour at 245° C. the reaction mixture was given a 2% Darco G–60 decolorizing carbon treatment. The product was cooled to 180° C. and filtered free of carbon. The product was a yellow solid having the following analytical values:

| | |
|---|---|
| Acid number | 4 |
| Hydroxyl value | 170 |
| Ester value | 138 |
| Melting point | ° C__ 41–42 |

*Example 6*

438 g. of white olein, representing about 1.5 mols oleic acid, were reacted with 273 g. (1.5 mols) mannitol in the presence of 1.64 cc. 85% $H_3PO_4$. The reaction was carried out in a glass flask equipped with an agitator, a carbon dioxide inlet tube to permit the use of an inert atmosphere and an inverted U air condenser. The reactants were heated with agitation in an inert atmosphere of carbon dioxide for one and one-half hours at 220–225° C. after which time the reaction mixture became uniformly clear in appearance. The product was given a 2% Darco G–60 treatment at this time and the heating continued for an additional half-hour at 220–225° C. The product was filtered free of carbon. It was a reddish yellow oil having a color of 130 Hess-Ives units as measured directly in a 6 mm. Hess-Ives tint photometer cell and having the following analytical values:

| | |
|---|---|
| Acid number | 7 |
| Hydroxyl value | 150 |
| Ester value | 145 |
| Viscosity at 25° C | centipoises__ 1200 |

The product was composed chiefly of mannide monoleate.

*Example 7*

451 lbs. of triple distilled oleic acid (Crystal White Oleine), acid number 197, were reacted with 180 lbs. of mannitol in the presence of 76 cc. of 85% $H_3PO_4$ at a reaction temperature of 255° C. for 3.6 hours. This reaction was carried out in a 100 gallon stainless steel kettle in an inert atmosphere of carbon dioxide and employing vigorous agitation. It required 1.9 hours for the charge to reach reaction temperature. 15 lbs. of decolorizing carbon, about 2% of charge weight, were added during the last 1 hour at 255° C. The charge was blown over into a water jacketed, press feed tank flooded with carbon dioxide, cooled rapidly to 70° C. and filtered free of carbon.

The above product was bleached by adding 1% lauroyl peroxide to the cold charge and heating the charge with agitation at a temperature of 90–95° C. and holding this temperature for 1 hour with continuous agitation. The properties of this ester were, color 20 Hess-Ives units, viscosity at 25° C., 335 centipoises, acid number 6.2, hydroxyl value 122, ester value 167.

The following examples illustrate absorption bases of the present invention:

*Example 8*

10 parts of the product of Example 6, 5 parts of beeswax, 60 parts petrolatum, and 25 parts of mineral oil (65–70° Say.) were warmed to 65° C. and mixed together to form a homogeneous mixture. The mixture is then allowed to cool.

This absorption base has a high water absorption value and can be used directly in the preparation of water-in-oil type creams, salves, etc. Preparations with this base may contain strongly acidic electrolytes without failure of the emulsion.

In this formulation ceresin wax or paraffin wax can be used in place of beeswax.

Example 9

A simple absorption base can be prepared by melting petrolatum 90 parts and 10 parts of the product of Example 6. On cooling, an absorption base capable of emulsifying 22 times its weight of water is produced.

Example 10

2 grams of the product of Example 4 were dissolved in a mixture of 28 grams petrolatum and 10 gram beeswax at 70° C.

On cooling, this mixture provided an absorption base capable of forming water-in-oil emulsions of good stability even in the presence of acidic electrolytes.

Example 11

38 parts of petrolatum were melted and held at about 70° C. at which time 2 parts of the product of Example 1 were admixed with stirring. On cooling this mixture was an efficient water absorption base.

Example 12

28 parts of petrolatum and 10 parts of beeswax were melted together at 70° C. and 2 parts of the product of Example 6 stirred into the mix. This mixture on cooling was a useful absorption base.

Example 13

The following ingredients were melted and mixed together:

| Ingredient | Percentage by weight |
| --- | --- |
| | Per cent |
| Emulsifier of Example 6 | 5 |
| Ceresin wax (melting point 156–160° F.) | 15 |
| Petrolatum | 20 |
| Mineral oil U. S. P. (65–70° Say.) | 50 |
| Lanolin (anhydrous) | 10 |
| | 100 |

The mixture was then allowed to cool forming a useful ointment base.

Absorption bases according to the present invention may contain varying amounts of oleaginous material and emulsifier. In all cases the bases contain an amount of emulsifier sufficient to impart substantial water absorbing properties. The degree to which each base must absorb water (or be hydrophilic) will depend upon the use to which it will be put.

The above described absorption bases are capable of many uses. It will be understood that the specific bases of the examples are intended as illustrative only and the invention is not to be limited thereto.

The following examples illustrate some of the preparations that can be made with the absorption bases of Examples 8 to 13.

Example 14

40 grams of the base of Example 10 were heated to 70° C. A solution of 20 g. aluminum chloride (hydrated) in 40 g. water was heated to 70° C. and added to the heated base. The mixture was stirred mechanically during the addition and until the product had cooled to room temperature.

The resulting cream was of the water-in-oil type and was useful as a perspiration inhibitor and astringent.

Example 15

40 parts of the base of Example 11 were heated to 70° C. 20 parts of sodium sulfate were dissolved in 40 parts water and the solution heated to 70° C. The solution was then slowly added to the heated base with continued stirring. A smooth emulsion, stable even after long standing was produced.

Aluminum sulfate or other electrolyte can be substituted for sodium sulfate in this preparation.

Example 16

35 parts of the absorption base of Example 8 were heated to about 60–65° C. A solution of 10 parts aluminum sulfate in 35 parts water was likewise heated to about 60–65° C. The heated solution was slowly added to the base with constant stirring. After incorporation was complete, 20 parts of acid washed talc were mixed into the emulsion.

The resulting cream is an anti-perspirant preparation of the water-in-oil type.

Example 17

The ointment base of Example 13 can be used for preparing the following medicinal products:

| Ointment | Medicament | Percentage medicament | Phase in which medicament added | Base, per cent | Water, per cent |
| --- | --- | --- | --- | --- | --- |
| (a) | Zinc oxide | 10 | Oil | 50 | 40 |
| (b) | Tannic acid | 10 | Aqueous | 50 | 40 |
| (c) | Phenol | 0.5 | Oil | 50 | 49.5 |
| (d) | Calomel | 5.0 | do | 50 | 45 |
| (e) | do | 20.0 | do | 50 | 30 |

In making up the emulsions both the water and the oil (ointment base) phases were separately heated to a temperature of about 60–65° C. and the aqueous phase was then added to the oil phase with constant stirring. After incorporation was complete the emulsions were homogenized at 50–60° C. and filled into jars while hot.

Example 18

A base suitable for use in preparing ointments by simple mixing such as is usually employed in compounding drug prescriptions was formulated as follows:

BASE

| | Per cent |
| --- | --- |
| The product of Example 7 | 10 |
| Ceresin | 10 |
| Petrolatum | 15 |
| Mineral oil | 45 |
| Lanolin | 20 |

The base was prepared by warming and mixing the ingredients.

Two methods suitable for preparing prescription ointments were employed using this base.

The first method was to emulsify the ointment composition at room temperature by simply stirring the oil phase and adding portions of the aqueous phase until emulsification was complete. After 67 days storage at room temperature and at 100° F. the ointment compositions were sufficiently stable for use as drug prescriptions.

The second method of compounding the same ointment formulae was to warm the (base) oil and aqueous phases and the medicament to 60–65° C. Next the composition was stirred in a suitable container, such as a beaker, by hand with a spatula until the composition was emulsified.

At a temperature of 40–50° C. the ointments were poured into jars and allowed to set.

These preparations were stable after 66 days storage at 100° F. and at room temperature. Ordinarily drug prescription ointments are required to be stable for a period of only 6 to 8 weeks.

The following is a table listing the composition of the various ointments prepared by both of the methods described above.

| Ingredient | Parts by weight | | | | |
|---|---|---|---|---|---|
| | (f) | (g) | (h) | (i) | (j) |
| Ointment | 45.0 | 47.5 | 49.75 | 47.5 | 45.0 |
| Base | | | | | |
| Water | 45.0 | 47.5 | 49.75 | 47.5 | 45.0 |
| Colloidal sulfur | 10.0 | | | | |
| Boric acid | | 5.0 | | | |
| Zinc sulfate | | | 0.5 | | |
| Salicylic acid | | | | 5.0 | |
| Yellow oxide mercury | | | | | 10.0 |

In place of the specific formulations of Examples 14 to 18 many others are possible with the absorption bases of the invention.

It will be apparent that an absorption base according to the invention can contain added materials such as oil soluble medicaments or the like. The absorption base can be prepared from its ingredients by the compounder of the ultimate cream or salve but preferably the base is prepared in larger amounts and distributed as such. The latter procedure offers greater advantages to a compounder who thus avoids many preliminary operations in making up his product.

Absorption bases of the type of this invention are not necessarily made into emulsions but may be used as ointments or salves either with or without added substances such as medicaments. For use on moist surfaces such products possess the advantage of improved wetting properties and hence better efficiency. Also such products possess the property of washing off readily.

Where the absorption bases are employed in the formulation of emulsions the product may vary in consistency from a stiff composition to a very soft cream by manipulation of the content of water, wax, filler, etc., according to techniques well understood in the arts.

I claim:

1. An absorption base consisting essentially of oleaginous material; and an emulsifier incorporated therewith consisting essentially of a mannide monoester of a fatty acid with from 12 to 18 carbon atoms, and the other esters, produced in the anhydridization-esterification reaction of mannitol with the said fatty acid of from 12 to 18 carbon atoms, and said emulsifier having a ratio of fatty acid equivalents to carbon atoms of mannitol residue of from about 0.15 to 0.25, and the ratio of hydroxyl value to ester value of said emulsifier being from about 0.5 to 2.0.

2. An absorption base according to claim 1 wherein the fatty acid of said emulsifier is oleic acid.

3. An absorption base consisting essentially of oleaginous material; and an emulsifier incorporated therewith consisting essentially of mannide monooleate, and the other esters produced in the anhydridization-esterification reaction of 1 mol of mannitol with about 1.5 mols of oleic acid, said emulsifier having a ratio of hydroxyl value to ester value of about 1.

4. An absorption base consisting essentially of oleaginous material; and an emulsifier incorporated therewith consisting essentially of a sorbide monoester of a fatty acid with from 12 to 18 carbon atoms and the other esters produced in the anhydridization-esterification reaction of sorbitol with said fatty acid of from 12 to 18 carbon atoms, and said emulsifier having a ratio of fatty acid equivalents to carbon atoms of sorbitol residue of from about 0.15 to 0.25, and the ratio of hydroxyl value to ester value of said emulsifier being from about 0.5 to 2.0.

5. An absorption base consisting essentially of oleaginous material; and an emulsifier incorporated theerwith consisting essentially of a mixture of a hexide monoester of a fatty acid having at least 6 carbon atoms and the other esters produced in the reaction of a polyhydroxylic material selected from the group consisting of hexitols, hexitans, hexides, and mixtures of hexitols and hexane pentols, and the said fatty acid with at least 6 carbon atoms, said mixture having a ratio of fatty acid equivalents to carbon atoms of polyhydroxylic residue of from about 0.15 to 0.25, and the ratio of hydroxyl value to ester value of said mixture being from about 0.5 to 2.0.

6. An absorption base consisting essentially of oleaginous material; and an emulsifier incorporated therewith consisting essentially of a mixture of a hexide monoester of a fatty acid with from 12 to 18 carbon atoms and the other esters produced in the reaction of a polyhydroxylic material selected from the group consisting of hexitols, hexitans, hexides, and mixtures of hexitols and hexane pentols, and the said fatty acid with from 12 to 18 carbon atoms, said mixture having a ratio of fatty acid equivalents to carbon atoms of polyhydroxylic residue of from about 0.15 to 0.25, and the ratio of hydroxyl value to ester value of said mixture being from about 0.5 to 2.0.

7. An absorption base consisting essentially of oleaginous material; and an emulsifier consisting essentially of a mixture of sorbide monoester of a fatty acid with from 12 to 18 carbon atoms and the other esters produced in the anhydridization-esterification reaction of a mixture of hexitols and hexane pentols and the said fatty acid with from 12 to 18 carbon atoms under conditions promoting esterification with said fatty acid and anhydridization of said mixture, the said emulsifier having a ratio of fatty acid equivalents to carbon atoms of the residue of said mixture of from about 0.15 to 0.25, and the ratio of hydroxyl value to ester value of said emulsifier being from about 0.5 to 2.0.

KENNETH R. BROWN.